United States Patent
Rönpagel et al.

(10) Patent No.: US 11,278,753 B2
(45) Date of Patent: *Mar. 22, 2022

(54) FIRE EXTINGUISHING SYSTEM

(71) Applicant: MV Pipe Technologies GmbH, Wittenberge (DE)

(72) Inventors: Andreas Rönpagel, Ahrensburg (DE); Michael Steinhoff, Herdecke (DE)

(73) Assignee: MV Pipe Technologies GmbH, Wittenberge (DE)

( * ) Notice: Subject to any disclaimer, the term of this patent is extended or adjusted under 35 U.S.C. 154(b) by 426 days.

This patent is subject to a terminal disclaimer.

(21) Appl. No.: 16/534,868

(22) Filed: Aug. 7, 2019

(65) Prior Publication Data

US 2019/0358477 A1    Nov. 28, 2019

Related U.S. Application Data

(63) Continuation of application No. 15/921,430, filed on Mar. 14, 2018, now Pat. No. 10,413,765, which is a
(Continued)

(30) Foreign Application Priority Data

Feb. 5, 2012  (EP) .................................... 12153964

(51) Int. Cl.
*A62C 35/68* (2006.01)
*F16L 58/10* (2006.01)
*B05D 7/22* (2006.01)

(52) U.S. Cl.
CPC ................ *A62C 35/68* (2013.01); *B05D 7/22* (2013.01); *F16L 58/1009* (2013.01); *F16L 58/1054* (2013.01)

(58) Field of Classification Search
CPC .......... A62C 35/68; A62C 35/58; B05D 7/22; B05D 7/222; B05D 7/225; F16L 58/1009; F16L 58/1045
See application file for complete search history.

(56) References Cited

U.S. PATENT DOCUMENTS

| 914,233 A | 3/1909 | Breslauer |
|---|---|---|
| 2,326,844 A | 8/1943 | Ely |

(Continued)

FOREIGN PATENT DOCUMENTS

| CN | 1736617 A | 2/2006 |
|---|---|---|
| CN | 2928269 Y | 8/2007 |

(Continued)

OTHER PUBLICATIONS

Written Opinion of the International Searching Authority for PCT/EP2013/051394 (in English and German) dated May 5, 2013; ISA/EP.

(Continued)

*Primary Examiner* — Tuongminh N Pham
(74) *Attorney, Agent, or Firm* — Perkins Coie LLP

(57) ABSTRACT

A fire extinguishing system including a fluid source, at least one sprinkler (2), and distribution pipes (3). The distribution pipes (3) are formed at least partially as soft-steel metal pipe having a friction loss defined according to the Hazen-Williams formula (1), with $P = 6.05 \cdot 10^5 \cdot L \cdot Q^{1.85} \cdot C^{(-1.85)} \cdot d^{(-4.87)}$, in which P=pressure drop in the pipeline, in bar, Q=flow rate through the pipeline, in l/min, d=average inside diameter of the pipe, in mm, C=constant for the type and condition of the pipeline, and L=equivalent length of pipe sections and pipe fittings, in m. The distribution pipes (3) have an anti-corrosion coating on the inside in order to ensure a value for C in a range of 125 to 150 during commissioning of the fire extinguishing system.

14 Claims, 1 Drawing Sheet

Related U.S. Application Data continuation of application No. 14/376,347, filed as application No. PCT/EP2013/051394 on Jan. 25, 2013, now Pat. No. 9,962,569.

(56) References Cited

U.S. PATENT DOCUMENTS

| | | |
|---|---|---|
| 2,718,474 A | 9/1955 | Hodil et al. |
| 3,567,521 A | 3/1971 | Toy et al. |
| 3,701,336 A | 10/1972 | Mcconnell et al. |
| 4,212,781 A | 7/1980 | Evans |
| 4,252,867 A | 2/1981 | Nemoto et al. |
| 4,347,172 A | 8/1982 | Nishida |
| 4,398,346 A | 8/1983 | Underhill et al. |
| 4,986,210 A | 1/1991 | Holstein |
| 5,196,272 A | 3/1993 | Morishige et al. |
| 5,385,758 A | 1/1995 | Ahmed |
| 5,470,111 A | 11/1995 | Nelson |
| 5,939,491 A | 8/1999 | Wilt |
| 6,000,436 A | 12/1999 | Auvil |
| 7,426,784 B2 | 9/2008 | Spears |
| 7,475,786 B2 | 1/2009 | Mcvay |
| 7,819,140 B2 | 10/2010 | Bass et al. |
| 9,211,427 B2 | 12/2015 | Rönpagel et al. |
| 2007/0166466 A1 | 7/2007 | Kashiwada |
| 2007/0221388 A1 | 9/2007 | Johnson |
| 2009/0098296 A1 | 4/2009 | Finne et al. |
| 2009/0194187 A1 | 8/2009 | Laumann et al. |
| 2010/0189909 A1 | 7/2010 | Dixon et al. |
| 2011/0003161 A1 | 1/2011 | Abu-Shanab et al. |
| 2011/0097503 A1 | 4/2011 | Shay |
| 2011/0224347 A1 | 9/2011 | Prusty et al. |
| 2011/0294918 A1 | 12/2011 | Kenig |

FOREIGN PATENT DOCUMENTS

| | | |
|---|---|---|
| CN | 201779403 U | 3/2011 |
| JP | H06193792 A | 7/1994 |
| JP | H8215335 | 8/1996 |
| JP | 2004194691 A | 7/2004 |
| JP | 2010000264 | 1/2010 |
| WO | WO2013/113434 | 8/2013 |

OTHER PUBLICATIONS

Anonymous: "Autophoretic Aquence Industrial Coating Plating Steel Surface Protection Zinc Alternative", Jan. 1, 2007, XP055367883, 1 page.

Henkel: "Aquence 930 Coating", Jan. 1, 2010, XP055367890, 2 pages.

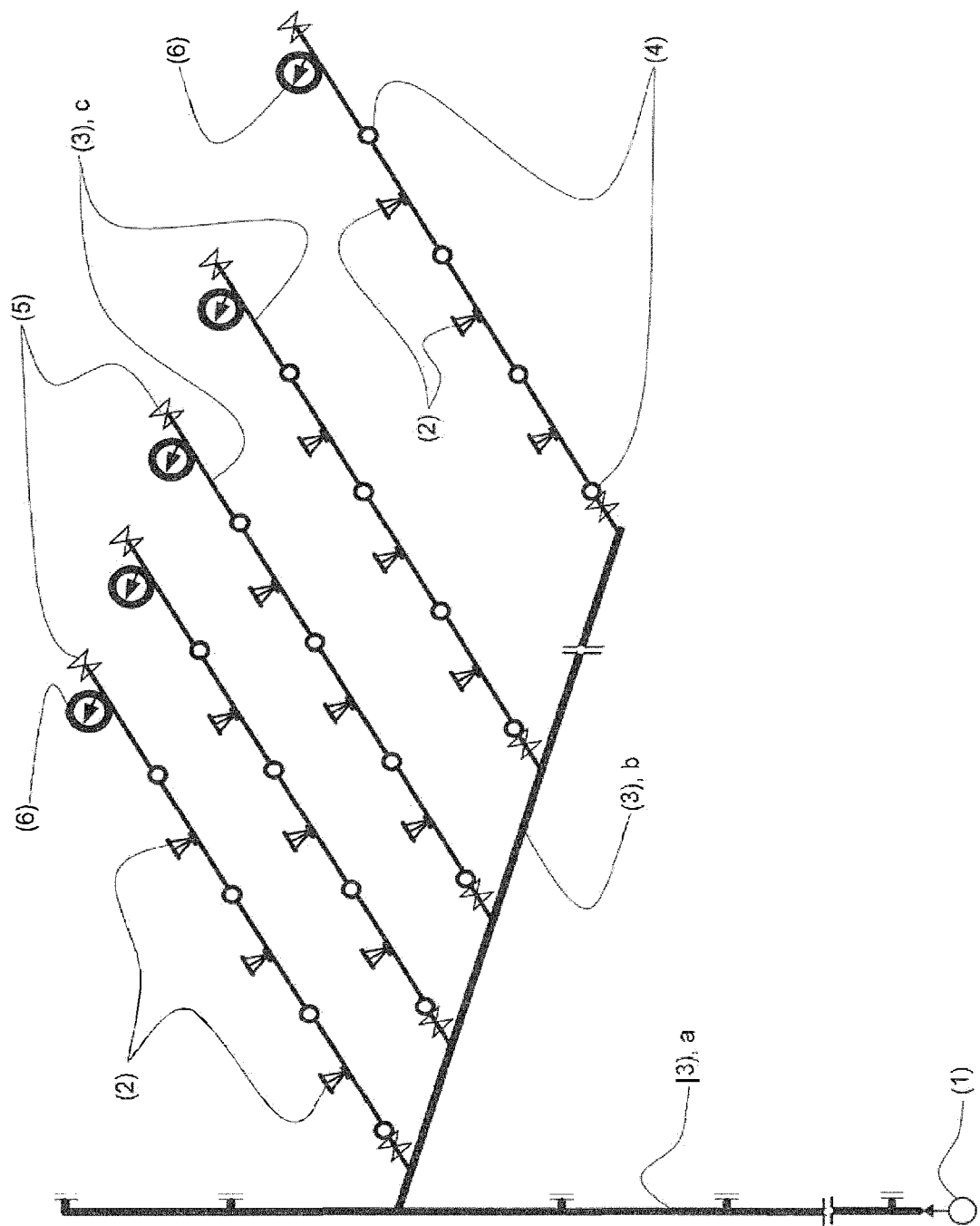

FIRE EXTINGUISHING SYSTEM

CROSS-REFERENCE TO RELATED APPLICATIONS

This application is a continuation of U.S. patent application Ser. No. 15/921,430 filed Mar. 14, 2018, which is a continuation of Ser. No. 14/376,347 filed Aug. 1, 2014, now U.S. Pat. No. 9,962,569 granted May 8, 2018, which is National Stage of International Application No. PCT/EP2013/051394, filed Jan. 25, 2013, which claims priority to European Application No. 12153964.7, filed Feb. 5, 2012. The entire disclosures of the above applications are incorporated herein by reference.

FIELD

The present invention concerns a fire extinguishing system for distributing an extinguishing medium, wherein such a fire extinguishing system at least comprises: means (1) for providing the extinguishing medium, at least one means (2) for applying the extinguishing medium, transport means (3) for connecting the means (1) for providing the extinguishing medium to the at least one means (2) for applying the extinguishing medium.

In that case in accordance with the known state of the art the transport means (3) are at least partially in the form of mild steel metal pipe.

In that case the pipe friction loss in pipes is defined in accordance with the Hazen-Williams formula (1) with $$P = 6.05 \cdot 10^5 \cdot L \cdot Q^{1.85} \cdot C^{(-1.85)} \cdot d^{(-4.87)}$$

wherein:
P=pressure drop in the pipe, in bars,
Q=through-flow rate through the pipe, in l/min,
d=mean inside diameter of the pipe, in mm,
C=constant for type and condition of the pipe, and
L=equivalent length of pipe and shaped portions, in m.

In principle the calculation of pressure drops in pipes on a predetermined pipe length is possible in particular using the Darcy-Weisbach equation which admittedly however is generally extremely complicated to use. For that reason the use of the empirical Hazen-Williams formula (1) has gained acceptance generally and in particular for the design and calculation of sprinkler installations.

In principle the calculation of pressure drops in pipes on a predetermined pipe length is possible in particular using the Darcy-Weisbach equation which admittedly however is generally extremely complicated to use. For that reason the use of the empirical Hazen-Williams formula (1) has gained acceptance generally and in particular for the design and calculation of sprinkler installations.

BACKGROUND AND SUMMARY

The inventors initially found themselves confronted with the task of a monetary improvement in the design and operation of sprinkler installations. Particularly the aspect of the task of monetary improvement in the operation of sprinkler installations involves the recognized problem that, in sprinkler installations, after many months after having been brought into operation, leakages in the couplings as the typical connections of transport means (3) in the form of metal pipes can sometimes occur, which ultimately leads to repair operations and insurance damage and thus a significant increase in costs within operation of sprinkler installations. Admittedly the last-mentioned problem can be overcome by galvanized metal pipes in fitments, but a solution which is satisfactory in all respects and which in particular can also be financially viable above all for larger sprinkler installations has however still to be achieved in spite of numerous approaches, especially as it is precisely that galvanized pipes are to be assessed from a rather critical point of view in regard to operational problems.

The inventors tried in their considerations to also use the mathematical dependencies of values in the Hazen-Williams formula (1). Therein in particular a relationship between the pressure drop in the pipe, P[bar], and the dimension-less constant C is of interest. In accordance with the information in the German Standard DIN EN 12845, Version 07/2009, in that respect the values of following Table 1 apply:

TABLE 1

| Type of pipe | C-value |
| --- | --- |
| Cast iron | 100 |
| Ductile cast iron | 110 |
| Steel, black - this corresponds to mild steel in accordance with the present invention | 120 |
| Galvanized steel | 120 |
| Centrifugal concrete | 130 |
| Cement-clad cast iron | 130 |
| Non-rusting steel - this is high-quality steel | 140 |
| Copper | 140 |
| Reinforced glass fiber | 140 |

The inventors finally realized that both aspects of the underlying problem can be solved by means of a fire extinguishing system for distributing an extinguishing medium, wherein such a fire extinguishing system has at least: means (1) for providing the extinguishing medium, at least one means (2) for applying the extinguishing medium, transport means (3) for connecting the means (1) for providing the extinguishing medium to the at least one means (2) for applying the extinguishing medium, wherein the transport means (3) are at least partially in the form of mild steel metal pipe, wherein the pipe friction loss in pipes is defined in accordance with the Hazen-Williams formula (1) with $$P = 6.05 \cdot 10^5 \cdot L \cdot Q^{1.85} \cdot C^{(-1.85)} \cdot d^{(-4.87)}$$

wherein:
P=pressure drop in the pipe, in bars,
Q=through-flow rate through the pipe, in l/min,
d=mean inside diameter of the pipe, in mm,
C=constant for type and condition of the pipe, and
L=equivalent length of pipe and shaped portions, in m.

The fire extinguishing system proposed here is characterized in that: the transport means (3) which are at least partially in the form of mild steel metal pipe have an at least inwardly disposed corrosion protection coating, and the inwardly disposed corrosion protection coating is adapted to ensure a value for C in a range of 125 to 150 when the fire extinguishing system is commissioned.

The value C in that respect refers to the transport means (3) which are in the form of a mild steel metal pipe and which have the inwardly disposed corrosion protection coating characterizing the invention.

According to the inventors' realization which is essential to the invention an inwardly disposed corrosion protection coating for the transport means (3) which at least partly are in the form of a mild steel metal pipe is singly and solely suitable for ensuring for the constant C a value in a range of 125 to 150 when the fire extinguishing system is commissioned and—preferably—equally also within a period of use of a year and quite particularly preferably also within a period of use of five years after commissioning of the fire extinguishing system. Ensuring a value for C in the range characterizing the invention and still further in the preferred ranges of the invention presented here, on the basis of the inwardly disposed corrosion protection coating which is provided in that way, affords a completely even and non-porous sealing means in respect of the insides of the metal pipes (3), which no longer has the extinguishing medium which is passed through the metal pipes (3) infiltrating therebeneath, even over many years, and that applies even for the ends of the metal pipes (3), which are brought together in the couplings.

Quite particularly preferably the inwardly disposed corrosion protection coating for the transport means (3) which at least partly are in the form of a mild steel metal pipe is suitable, for the constant C, for ensuring a value in a range of 135 to 150 when the fire extinguishing system is commissioned and—preferably—equally also within a period of use of a year and quite particularly preferably also within a period of use of five years after commissioning of the fire extinguishing system.

In principle pipes comprising centrifugal concrete, cement-clad cast iron, high-quality steel, copper and reinforced glass fiber are also suitable at least to a limited extent for ensuring a value in the claimed ranges for the constant C, but for different reasons they are ruled out in terms of their surface-coverage use entirely: pipes of centrifugal concrete or cement-clad cast iron have a wall which is much too thick and related thereto a weight which is much too great so that their surface-coverage in the sense of a usual use in buildings is already impossible for that reason alone. For the above-mentioned reasons of weight and by virtue of their excessively low flexural index pipes of centrifugal concrete or cement-clad cast iron can be considered exclusively in the ground as transport means (3) for connecting the means (1) for providing the extinguishing medium to the at least one means (2) for applying the extinguishing medium; pipes of high-quality steel, copper and reinforced glass fiber are admittedly possible in principle, but they are much too high in price and that has not gained acceptance in the market. In addition pipes of reinforced glass fiber and generally plastic are combustible or melt at high temperatures, which limits their use to regions involving a low burning loading and/or to being laid within cast concrete slabs. All three types of pipe which are possible in principle are not suitable for solving the underlying problem of the invention.

The invention is practically not limited in respect of the nominal size for the transport means (3) for connecting the means (1) for providing the extinguishing medium to the at least one means (2) for application of the extinguishing medium, in particular and preferably the mild steel metal pipes for providing the transport means (3) should be of a nominal width in a range of DN 32 to DN 250, which corresponds to the common pipe nominal widths of the main conduit [(3), a], for example in the form of riser conduits, of the fire extinguishing system proposed here, by way of possible secondary distribution pipes [(3),b], for example in the form of distributor conduits, as far as the sprinkler connection pipes [(3),c], for example in the form of branches (branch conduits). In a quite particularly preferred configuration the mild steel metal pipes for providing the transport means (3) are to be of a nominal width in a range of DN 32 to DN 65, which corresponds to the pipe nominal widths of usual secondary distribution pipes to the sprinkler connection pipes.

Without being restricted in this respect in accordance with the present invention the following examples for the means (2) for application of the extinguishing medium are deemed to be particularly preferred: sprinklers, in particular in the many configurations forming part of the state of the art, nozzles, simple pipe openings, and comparable components and devices for the issue and distribution of the extinguishing medium.

The fire extinguishing system proposed here is intended for the use of extinguishing media, wherein the medium is preferably chosen from the list including: water, foam, water-foam mixture, gas and chemical extinguishing agents.

In particular $CO_2$ and the noble gas argon are suitable for the extinguishing medium gas, while for the chemical extinguishing agents in particular those as are known at the date of filing of this specification are selected from:—the trade name FM-200® from DuPont of Geneva, Switzerland, and the trade name Novec™ 1230 from 3M of Neuss, Germany.

In particular the following: water film-forming foaming agent, for example 'Extensid AFFF 1%-3%' from 'Fabrik chemische Praparate Richard Sthamer GmbH & Co KG' of Hamburg, Germany, and also 'Fomtec AFFF' from 'Rosenbauer International AG' of Leonding, Austria, alcohol-resistant foaming agent, for example 'Extensid AFS LV 1%-3%' from 'Fabrik chemische Praparate Richard Sthamer GmbH & Co KG' of Hamburg, Germany, and also 'Fomtec ARC' from 'Rosenbauer International AG' of Leonding, Austria, protein foaming agent, for example 'Promax Spezial' from 'Minimax GmbH & Co KG' of Bad Oldesloe, Germany are deemed to be preferred as the foam, in the water-foam mixtures those types of foam are used in conjunction with water, wherein a ratio related to % by volume:

water:foam in a range of 100:1 to 100:3 is deemed to be particularly preferred.

A suitable frost protection agent can be added to the extinguishing medium, selected from the list including: water and water-foam mixture, to avoid splitting or blowout and/or damage of the means (2) for applying the extinguishing medium, and in particular the transport means (3) for connecting the means (1) for providing the extinguishing medium to the at least one means (2) for applying the extinguishing medium at low temperatures of use, preferably in a temperature range of 0 to −25° C., quite particularly preferably in a temperature range of 0 to −28° C. In particular the following are deemed to be preferred as frost protection agents: glycol-based frost protection agents, polypropylene glycol-based frost protection agents, and calcium chloride-based frost protection agents.

If water or a water-foam mixture is used as the extinguishing medium then preferably a single water supply presents itself for providing that extinguishing medium, and when the situation involves demands of higher reliability even a double water supply. The single or double water supply can be replaced or quite particularly preferably supplemented by at least one storage component for the extinguishing medium, selected from the list including: an open reservoir, a high-level tank, intermediate and supply containers. In that respect preferably the at least one storage component selected from the list including: high-level tanks and intermediate and supply containers, preferably has an inwardly disposed corrosion protection coating quite particularly preferably consisting of concrete and/or plastic.

The fire extinguishing system proposed here for distributing an extinguishing medium in all embodiments and variants disclosed herein can be both in the form of a wet sprinkler installation in which the transport means (3) is permanently filled with a or with the extinguishing medium, or also equally in the form of a dry sprinkler installation in which the transport means (3) are usually filled with a gas and the extinguishing medium is transported therethrough only in the situation of use. Both the above configurations of the fire extinguishing system proposed here are deemed to be preferred in accordance with the present invention.

In principle many different coatings for the transport means (3) are conceivable, like, for example, anodic and also cathodic dip-paint coating and Parkerising, with which the feature that is essential to the invention 'for ensuring a value for C in a range of 125 to 150 when the fire extinguishing system is commissioned' can be fulfilled. After many intensive considerations and tests linked to those considerations a particularly preferred configuration of the present invention of a novel fire extinguishing system is implemented if the inwardly disposed corrosion protection coating of the transport means (3) which are at least partly in the form of mild steel metal pipe is afforded by the Aquence™ method, in particular by means of the Aquence™ method of the 900 series.

The Aquence™ method developed by Henkel of Düsseldorf, Germany forms a coating here at the inside of the transport means (3) which are in the form of metal pipes, on a chemical basis, in which $FeF_3$ iron fluoride which is supplied in the form of a solution in fundamental fashion and with a view to the invention presented here provides for a liberation of $Fe^{2+}$ ions at the inside surface of the metal pipes, which bond to paint particles which are equally supplied in the form of the foregoing solution and which are then again deposited at the inside surface of the metal pipes. In the course of a prolonged deposition process over a period of a preferred length of 4 to 8 minutes, quite particularly preferably over a period of a length of 5 to 7 minutes, a coating is built up in that way, of a layer thickness in a preferred range of 15 to 28 µm, quite particularly preferably in a range of 21 to 27 µm. With the particularly preferred Aquence™ method of the 900 series an epoxy/acrylic-based inwardly disposed corrosion protection coating is produced in the above-described manner.

The inwardly disposed corrosion protection coating which is quite particularly preferably constituted by a continuous through flow with the solution in particular in accordance with the Aquence™ method of the 900 series ensures to a particularly persuasive degree that a value for C is guaranteed in a range of 125 to 150 when the fire extinguishing system is commissioned and even in a range of 135 to 150 within a period of use of 5 years. A further substantial advantage of an epoxy/acrylic-based inwardly disposed corrosion protection coating formed in that way is its resistance to: the preferred extinguishing media selected from the list including: water, foam, water-foam mixture, gas and chemical extinguishing agents, and the extinguishing agent additives, in which respect in particular the preferred frost protection agents are meant here.

In the numerous tests that preceded this invention it was found that, to build up a sufficiently thick epoxy/acrylic-based Aquence™ coating a continuous flow through the mild steel metal pipes (3) with the solution in accordance with the Aquence™ method of the 900 series using a through-flow speed within a range of 9 m/min to 18 m/min and even better 12 m/min to 15 m/min over a period of a preferred length of 4 to 8 minutes and quite particularly preferably over a period of a length of 5 to 7 minutes is to be ensured, for which reason the specified ranges for the through-flow speed are deemed to be preferred solely and precisely in combination with the through-flow time.

By virtue of the fact that the inwardly disposed corrosion protection coating in accordance with all embodiments proposed here ensures a value for C at least in a range of 125 to 150 the inside of the metal pipes (3) is distinguished by a completely even and non-porous sealing means which even over many years can no longer have the extinguishing medium which is passed through the metal pipes (3) infiltrating therebeneath, for which reason such mild steel metal pipes for providing the transport means (3) can be of a wall thickness which is quite particularly preferably in a range of only still 2.0 mm to 2.5 mm, instead of the 2.6 mm thickness which today is still usual: thicker walls for the transport means (3) for connecting the means (1) for providing the extinguishing medium to the at least one means (2) for applying the extinguishing medium are no longer necessary for ensuring the greatest possible level of availability certainty. With the metal pipes (3) remaining of the same outside diameters the inside diameter can thus be increased by 0.2 mm to 1.2 mm.

In applying the invention proposed here in all the embodiments proposed here the through-flow rate Q through the pipes, in the form of a mild steel metal pipe with an inwardly disposed corrosion protection coating characterizing the invention can be increased by a percentage in a range of 4% to 34%, related to the through-flow rate of galvanized pipes.

DRAWINGS

The FIGURE hereinafter is intended to describe the invention more fully.

The FIGURE shows the structure in principle of an installation implemented for test purposes and to verify the invention made, that is in the form of a dry sprinkler installation with periodically implemented sprinkler inserts.

DETAILED DESCRIPTION

A branched system of transport means (3) is connected to a means (1) (only diagrammatically indicated) for providing the extinguishing medium, here water, in the form of a single water supply, wherein the transport means (3) include a central riser conduit [(3), a] a plurality of distributor conduits [(3), b] branching from the central riser conduit [(3), a], and for each distributor conduit [(3), b] a respective plurality of branches or branch conduits [(3), c]. In that respect for the sake of simplicity of the drawing, the FIGURE completely shows only one distributor conduit [(3), b] and in relation thereto only a few branches [(3), c].

Each branch [(3), c] has at its beginning directed to the distributor conduit [(3), b] and at its end a respective ball valve (5), upstream of the ball valve (5) at the end of the branch [(3), c] a manometer (6), three respective sprinklers as means (2) for applying the extinguishing medium, and a plurality of coupling connections (4) for possible individual replacement of each sprinkler (2).

In total fitted in the test installation there are thus a total of 60 branches [(3), c] of a respective nominal width of DM 32 and of a respective wall thickness of 2.6 mm, five branches [(3), c] of mild steel metal pipes with an epoxy/acrylic-based inwardly disposed corrosion protection coating. In that arrangement that inwardly disposed corrosion protection coating in all of those five branches [(3), c] is of a thickness in a range of 15 to 27 in the branches [(3), c] of the particularly preferred variant the thickness is in a narrower range of 21 to 27 µm. In all of those five branches [(3), c] the epoxy/acrylic-based inwardly disposed corrosion protection coating is produced by means of the Aquence™ method of the 900 series. A further 49 branches [(3), c] of the test installation are constructed with galvanized mild steel metal pipes, the remaining six branches [(3), c] have mild steel metal pipes without any internal coating.

After a 12 month test time with constantly changing operating conditions and severe outside climate fluctuations from moist-warm through dry-hot to dry-cold and wet-cold the branches [(3), c] of mild steel metal pipes with the epoxy/acrylic-based inwardly disposed corrosion protection coating exhibit scarcely any corrosion at the respective branch ends while surface corrosion cannot be detected at all. All threads on the respective coupling connections (4) after the end of the test time are also still completely sealed and exhibit in principle no corrosion attacks. In contrast both the galvanized mild steel metal pipes and also the mild steel metal pipes without any internal coating at the branch ends and towards the coupling connections (4) have a marked rusting attack in the pipe interior, even if slight but clearly detectable, which leads to a marked reduction in the C-values. Only the mild steel metal pipes with the epoxy/acrylic-based inwardly disposed corrosion coating have a value for C of 140 at the end of the 12-month test period, which exactly corresponds to the value at the beginning of the long-term test.

Thus the realizations deriving from operation of the test installation show on the one hand the great advantages of a fire extinguishing system according to the invention over previous fire extinguishing systems, while on the other hand they also show that, by means of the fire extinguishing system according to the invention, the underlying problems of the invention for achieving a monetary improvement in the design and operation of sprinkler installations can be lastingly solved.

LIST OF REFERENCES (1) means for providing the extinguishing medium
(2) means for applying the extinguishing medium
(3) transport means
  (3), a—riser conduit
  (3), b—distributor conduit
  (3), c—branch (conduit)
(4) coupling connection
(5) ball valve
(6) manometer

What is claimed is:

1. A mild steel metal pipe for a fire extinguishing system for distributing an extinguishing medium, the extinguishing system at least having
means for providing the extinguishing medium,
at least one means for applying the extinguishing medium,
transport means for connecting the means for providing the extinguishing medium to the at least one means for applying the extinguishing medium, wherein the transport means are at least partially in the form of a plurality of the mild steel metal pipes, and wherein the pipe friction loss in each of the mild steel pipe of the plurality of mild steel pipes is defined in accordance with the Hazen-Williams formula with $$P = 6.05 \cdot 10^5 \cdot L \cdot Q^{1.85} \cdot C^{(-1.85)} \cdot d^{(-4.87)}$$

wherein:
P=pressure drop in the pipe, in bars,
Q=through-flow rate through the pipe, in l/min,
d=mean inside diameter of the pipe, in mm,
C=constant for type and condition of the pipe, and
L=equivalent length of pipe and shaped portions, in m,
the mild steel pipe comprising:
an at least inwardly disposed corrosion protection coating, the inwardly disposed coating comprises a non-porous polymer layer containing iron and epoxy-acrylic, the non-porous layer being ionically bonded to at least an inner surface of the mild steel metal pipes and having a thickness greater than 15 µm to provide a value for C in a range greater than 120 to 150 when the fire extinguishing system is commissioned for use and has a nominal width in a range of DN 32 to DN 250.

2. The mild steel metal pipe for a fire extinguishing system according to claim 1, wherein the inwardly disposed corrosion protection coating provides a value for C in a range of 125 to 150.

3. The mild steel metal pipe for a fire extinguishing system according to claim 1, wherein the inwardly disposed corrosion protection coating is adapted to ensure a value for C in a range of 135 to 150 upon commissioning of the fire extinguishing system.

4. The mild steel metal pipe for a fire extinguishing system according to claim 1, wherein the inwardly disposed corrosion protection coating provides a value for C in a range of 135 to 150, and wherein the thickness greater than 15 µm comprises a thickness in the range of 15-28 µm.

5. The mild steel metal pipe for a fire extinguishing system according to claim 1, wherein the mild steel metal pipe for forming the transport means is of a nominal width in a range of DN 32 to DN 250.

6. The mild steel metal pipe for a fire extinguishing system according to claim 2, wherein the mild steel metal pipe for forming the transport means is of a nominal width in a range of DN 32 to DN 65.

7. The mild steel metal pipe for a fire extinguishing system according to claim 5, wherein the mild steel metal pipe comprises a wall thickness in a range of 2.0 mm to 2.5 mm.

8. The mild steel metal pipe for a fire extinguishing system according to claim 1, wherein the extinguishing medium is a medium selected from the list including: water, foam, water-foam mixture, gas, chemical extinguishing agents.

9. A corrosion resistant pipe for a fire extinguishing system that distributes an extinguishing medium, the system comprising a plurality of the corrosion resistant pipes, each corrosion resistant pipe, comprising: a mild steel pipe including a non-porous layer ionically bonded to at least an interior surface of the mild steel pipe, the non-porous layer containing iron and epoxy-acrylic and having a thickness of at least 15 µm to provide a C value in a range greater than 120 to 150 when used in the fire extinguishing system, and has a nominal width in a range of DN 32 to DN 250.

10. The corrosion resistant pipe for a fire extinguishing system of claim 9, wherein the non-porous layer containing iron and epoxy-acrylic is ionically bonded to an exterior surface of the mild steel pipe.

11. The corrosion resistant pipe for a fire extinguishing system of claim 9, wherein the nominal width in a range of DN 32 to DN 250 comprises a nominal width in a range of DN 32 to DN 65.

12. The corrosion resistant pipe for a fire extinguishing system of claim 11, wherein the mild steel pipe comprises a wall thickness in a range of 2.0 mm to 2.5 mm.

13. The corrosion resistant pipe for a fire extinguishing system of claim 11, wherein the non-porous layer containing iron and epoxy-acrylic is ionically bonded to an exterior surface of the mild steel pipe.

14. The corrosion resistant pipe for a fire extinguishing system of claim 9, wherein the thickness of the non-porous layer of at least 15 μm comprises a thickness in the range of 21-27 μm.

\* \* \* \* \*